United States Patent [19]

Hubbard

[11] Patent Number: 5,050,824
[45] Date of Patent: Sep. 24, 1991

[54] SECURE SUPPORT PIPE FASTENER

[75] Inventor: George R. Hubbard, P.O. Box 3644, Rancho Sante Fe, Calif. 92067

[73] Assignee: George R. Hubbard, San Diego, Calif.

[21] Appl. No.: 518,737

[22] Filed: May 2, 1990

[51] Int. Cl.$^5$ ............................................. F16L 3/22
[52] U.S. Cl. ..................................... 248/57; 248/68.1
[58] Field of Search ............... 248/68.1, 73, 57, 231.8, 248/74.1, 74.2, 62, 222.1, 214, 215, 217.3; 285/62, 64

[56] References Cited

U.S. PATENT DOCUMENTS

| | | | |
|---|---|---|---|
| 2,549,346 | 4/1951 | Tormo | 248/58 |
| 2,773,708 | 12/1956 | Beyerle | 248/57 X |
| 3,009,167 | 11/1961 | Leonard | 285/64 X |
| 3,021,103 | 2/1962 | Beyerle | 248/57 |
| 3,718,307 | 8/1969 | Albanese | 248/57 |
| 4,550,451 | 11/1985 | Hubbard | 248/68.1 X |
| 4,907,766 | 3/1990 | Rinderer | 248/57 |
| 4,909,461 | 3/1990 | Collins | 248/68.1 |

Primary Examiner—Ramon O. Ramirez
Assistant Examiner—Robert A. Olson
Attorney, Agent, or Firm—Brown, Martin, Haller & McClain

[57] ABSTRACT

A metal pipe bracket is disclosed for firmly securing a plumbing pipe within a stud bay. The metal pipe bracket has a U-channel that is slipped over a steel strap nailed between the two studs of a stud bay. Locking tabs located on the pipe bracket aligned with and snapped into locking holes on the steel strap. A metallic plumbing pipe either extending horizontally within the stud bay or vertically within the stud bay is then soldered to the pipe bracket thereby providing a secure attachment between the plumbing pipe and the stud bay structure. Secured in this manner, the plumbing pipe is held secure against vertical, horizontal, and axial movement. A pipe secured in this manner can be attached to a shower head or a shower water mixer valve. Upon subsequent use of the shower head or the mixer valve, the plumbing pipe is secure from movement that would normally be caused by repeated adjustment of the shower head and use of the water mixer valve. The disclosed brackets are inexpensive to manufacture, easy to use and provide a secure means of attaching plumbing pipe to a stud bay.

12 Claims, 3 Drawing Sheets

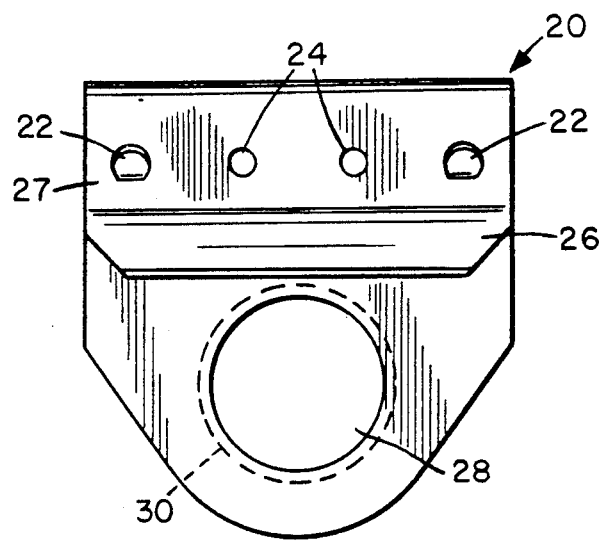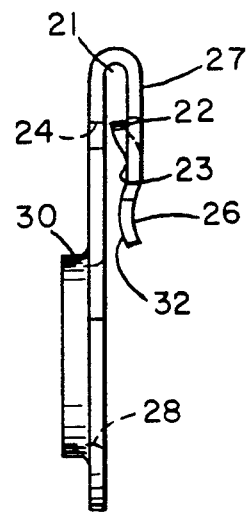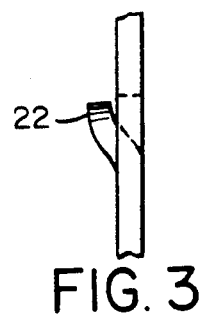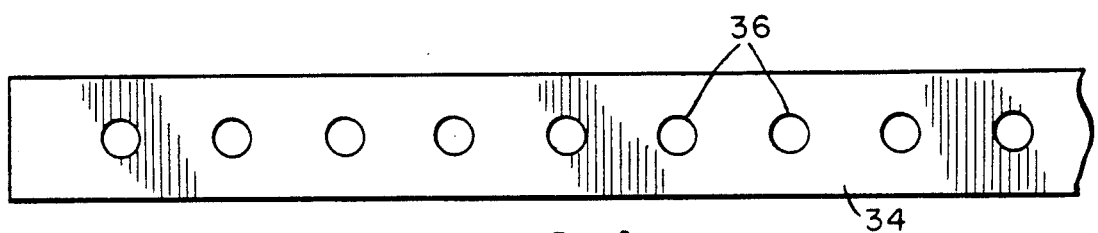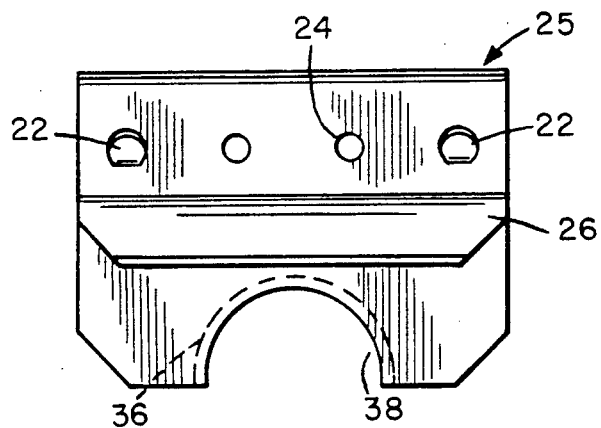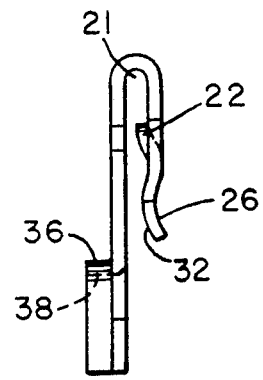

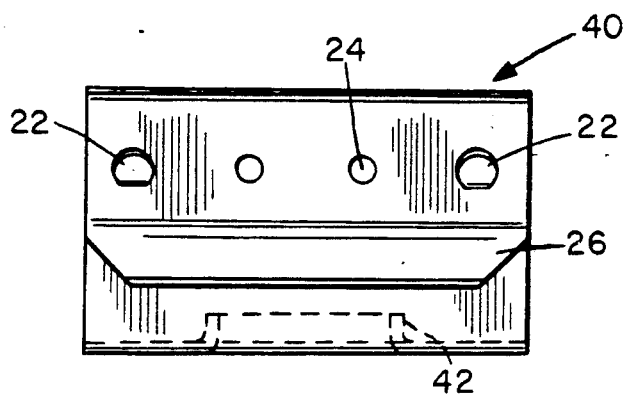
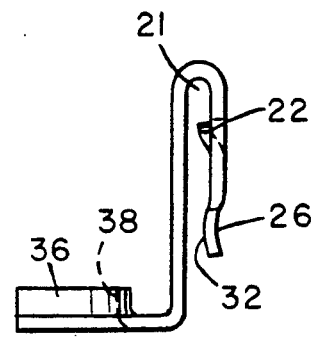
FIG. 7    FIG. 8
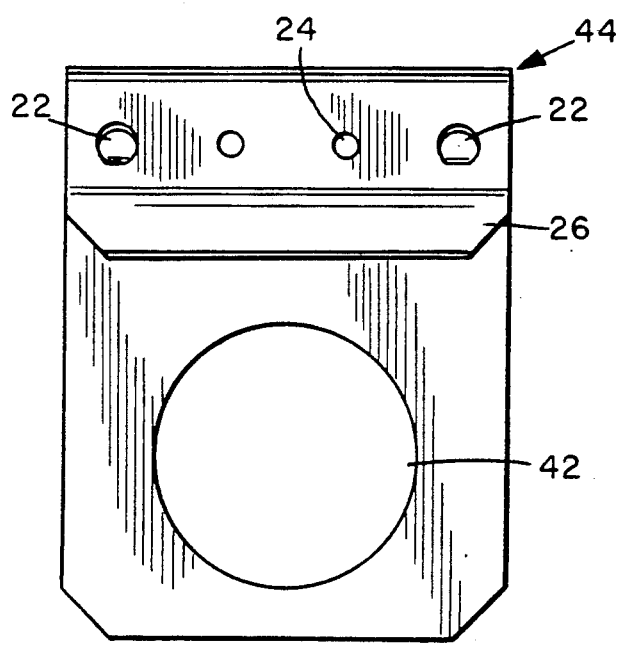
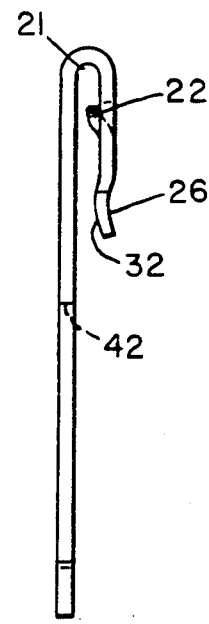
FIG. 9    FIG. 10

SECURE SUPPORT PIPE FASTENER

BACKGROUND

The present invention relates to a plumbing bracket that can be used wherever the hot or cold water supply stubs out from a wall. For example, during the rough phase of residential construction, copper pipe is typically run to designated rising points and then a concrete foundation is poured encapsulating the copper pipes. At the rising point, the copper pipe extends vertically from the floor to a point where it is to exit the wall. At these points, the pipe is turned 90° to exit the wall area for connection to valves, shower knobs, bathtub valves, and similar fixtures At the point where the copper pipes exit the wall in a horizontal manner, they have been secured to the wall with the use of such make shift techniques that include blocks of wood, wire, plumber's tape, bent nails, and the like. These means of securing the pipe to the wall can be awkward and ineffective in that a person constantly opening and closing a valve connected to a pipe secured in such a manner, will have a tendency to pull or push the valve which in turn causes the pipe in the wall to move and possibly weaken the joints. Other problems, such as rattling within the wall can occur if the pipe is not securely attached to the structure. Other fixtures such as shower heads have been secured in a similar fashion, again giving rise to rattling within the wall or structural weakening of the pipe joints.

To solve these problems, fittings were developed such as those described in the U.S. Pat. Nos. 2,773,708 and 3,021,103, the latter of which describes a means for fastening a plumbing fitting to a perforated strip through the use of a single fastening element such as a screw or a bolt. The pipe is then attached to the plumbing fitting. In this particular solution to the problem, the perforated strip has a flange running along the top of the strip that butts against the top portion of the bracket when the bracket is screwed into place. This flange prevents the bracket from rotating around the axis of the screw.

While this solution provides a secure method of attaching water pipes and the like to the frame of a house or a commercial construction project, it is time consuming to install and requires the use of a screw and a screw driver or other methods of attachments such as bolts or rivets.

Therefore, there exists a need for a fastener arrangement that is self locking and that would allow quicker, easier, and secure fastening of a copper pipe to the structure of a stud bay.

Therefore it an object of the present invention to provide an inexpensively manufactured, easy to use bracket that provides a secure connection between copper pipes and the structure of a dwelling.

It is a further object of the present invention to provide a connector that is self-locking when installed and is resistant to damage that frequently occurs during the rough phase of construction.

SUMMARY OF THE INVENTION

The present invention is a solid copper or copper plated metallic clamp that attaches to a metal strap that is typically nailed between the two studs of a stud bay. During the installation process, a piece of strap steel is nailed horizontally between the front faces of the two studs of a stud bay. The piece of strap steel has periodic and regularly spaced holes. The bracket of the present invention has a U-shaped upper section with a flat surface on one side of the U-section that has one or more, preferably two, locking tabs which lock into the holes of the strap that is running between the two studs. Once the bracket is snapped in place, the copper plumbing pipe can be easily soldered to the bracket which results in a secure self locking connection between the pipe and any structure where copper pipes would be used. Other products with comparable features must be secured to the strap by means of screws or rivets and do not lock into place with a simple snapping action as does the device of the present invention. The bracket itself can either be cold rolled steel that is copper plated to facilitate soldering, or it can be constructed entirely of full hard 110 copper. Once the pipe is secured and soldered in place, removing the pipe from the attached bar is virtually impossible without breaking the solder bond. This arrangement provides for a solid connection between the pipe and the structure of the house or building and therefore prevents the movement or rattling of pipes within the wall during repeated use of any plumbing fixture that may subsequently be attached to the pipe such as a shower head, shower water mixer valve, sink, or washing machine. The bracket of the present invention may be used anywhere hot or cold water supplies stub out from a wall.

The other objects and characteristic features of the present invention will become apparent from the description to be given in further detail herein below with reference to the accompanying drawings.

BRIEF DESCRIPTION OF THE DRAWINGS

FIG. 1 is a front view of a bracket of the present invention showing the location of the locking tabs as well as a full-round connection for a copper pipe;

FIG. 2 shows a side view of the bracket shown in FIG. 1;

FIG. 3 is an enlarged view of the locking tabs shown in FIGS. 1 and 2;

FIG. 4 is a front view of a perforated strap steel that supports the bracket shown in FIG. 1;

FIGS. 5 and 6 are respectively a front and side view of a plumbing bracket showing a half-round pipe connection area as opposed to the full-round connection of FIG. 1;

FIGS. 7 and 8 respectively show a front and side view of a plumbing bracket for securing a vertically rising pipe;

FIGS. 9 and 10 are respectively front and side views of a bracket used in connection with a plastic pipe securing device.

DETAILED DESCRIPTION OF THE PREFERRED EMBODIMENT

Figure 11:
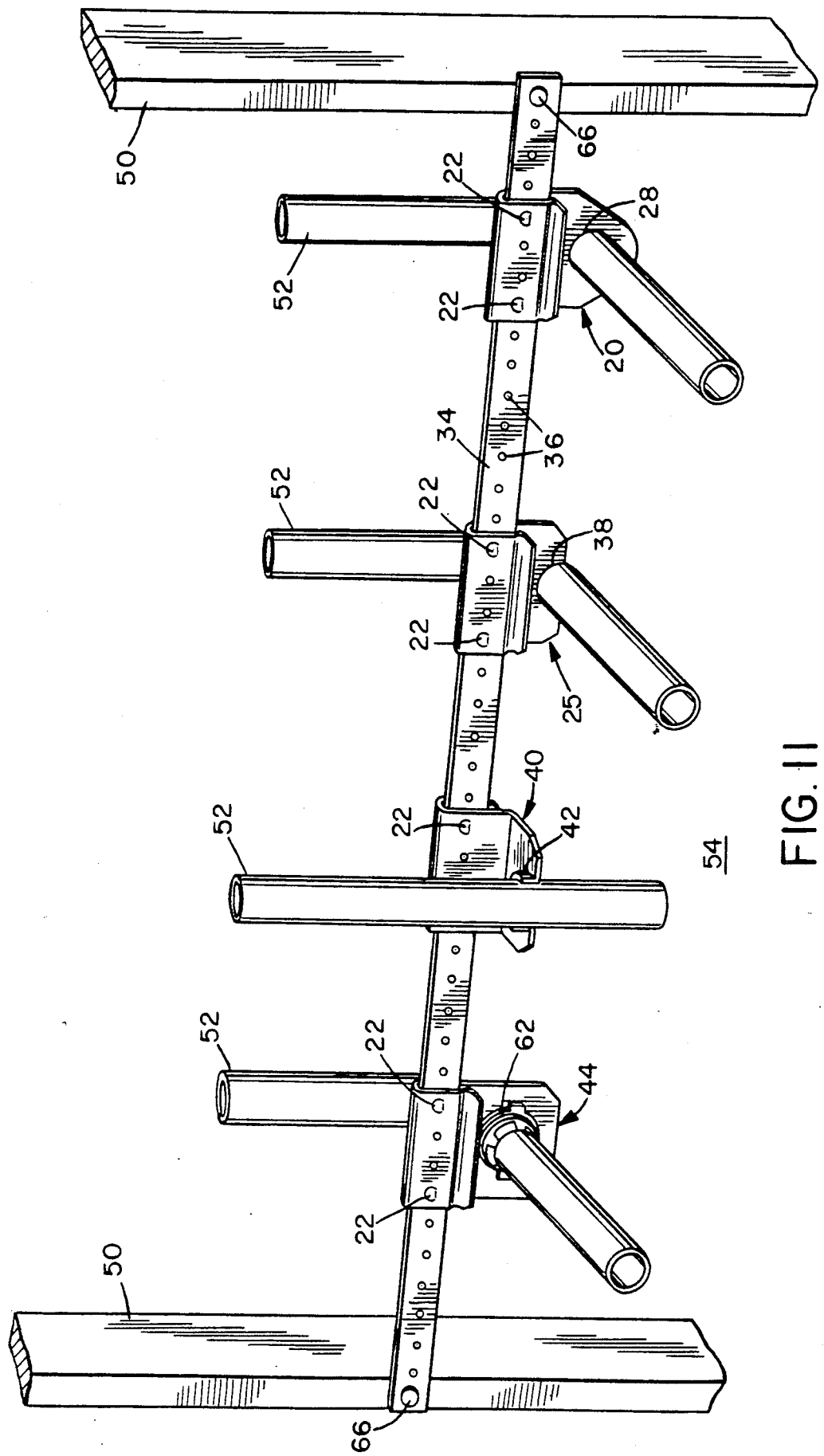
FIG. 11 is a prospective view of the brackets shown in FIGS. 1, 5, 7, and 9, as they would typically be used in a residential construction.

Turning now to the drawings in which FIGS. 1 through 11 show various aspects of the present invention and how it would typically be used in a residential construction. During the installation of copper plumbing pipes, a steel strap would be nailed between two studs of a stud bay. A bracket of the present invention would be snapped into place over a steel strap and a copper plumbing pipe would then be aligned with the bracket and soldered into place. The locking tabs of the pipe bracket would snap into locking holes of the steel strap thereby securely attaching the pipe bracket to the steel strap. Once this arrangement is in place, the plumbing pipe is securely attached to the dwelling structure thereby preventing horizontal, vertical, and axial movement of the pipe. A plumbing pipe attached to a dwelling house structure in this manner provides a secure and stable platform for the attachment of such fittings as a shower head pipe or a shower water mixer valve. The following discussion is in reference to residential construction but is also applicable to commercial construction and any situation in which it is necessary or desirable to securely fix a plumbing pipe to a structure such as a stud bay.

Turning now to FIG. 1, FIG. 1 shows a horizontal pipe bracket 20 having locking tabs 22, rivet holes 24, flange 26, full-round pipe hole 28, and support flange 30. Horizontal pipe bracket 20 is typically made from a 0.033 inch cold roll steel that has been copper plated. Copper plating is necessary so that copper pipe can be soldered to the flange 30, thereby making a secure attachment between a copper pipe and flange 30. When the horizontal pipe bracket 20 is constructed from cold roll steel, the bracket 20 is copper plated before it is stamped into the bracket form as shown in FIGS. 1 and 2. This is done because it would be difficult to copper plate the U-channel area 21 as shown in FIG. 2. FIG. 1 shows the location of the two locking tabs 22 and FIG. 2 shows a side view of the locking tabs 22. As shown in FIG. 2, the locking tabs 22 protrude from the backside 23 of the front face 27 of the bracket 20. FIG. 3 shows an expanded view of the locking tabs 22. Typically, the locking tabs 22 extend approximately 0.035 inch from the back face 23 of the bracket 20. The locking tabs are approximately 0.170 inches in diameter and correspond to the locking holes 36 of steel strap 34 (FIG. 4).

With reference to FIGS. 1, 2, 3, and 4, the horizontal pipe bracket 20 is typically inserted over the steel strap 34 so that a section of the steel strap 34 is located in the U-channel area 21 and the locking tabs 22 line up with and snap into the locking holes 36. This results in a secure attachment between the steel strap 34 and the horizontal pipe bracket 20. When the horizontal pipe bracket 20 is being installed on steel strap 34, the outward curve of flange 26, as shown in FIG. 2, facilitates the initial alignment between the horizontal pipe bracket 20 and the steel strap 34. The back surface 32 of flange 26 is pushed out of place as the horizontal pipe bracket 20 is being slid over the top of steel strap 34. When the horizontal pipe bracket 20 is in place, the back surface 32 of flange 26 is no longer in contact with the steel strap 34 and has the desired effect of locking the horizontal pipe bracket onto the steel strap 34. The U-channel area 21 shown in FIG. 2 of horizontal pipe bracket 20 is designed to be approximately 0.075 inches wide which is the same as the width of the steel strap 34. This provides a secure and snug fit when the bracket 20 is snapped into place.

After the horizontal pipe bracket 20 is snapped into place on the steel strap 34, a copper pipe is inserted through pipe hole 28. Pipe hole 28 has a diameter approximately 0.002 inches larger than the outside diameter of the copper pipe inserted therethrough. This allows the copper pipe to be easily inserted into the pipe hole 28 and at the same time provides a excellent bond when the copper pipe is soldered to the horizontal pipe bracket 20 at support flange 30. The copper pipe is in contact with the inside diameter of flange 30. The difference in size between the outside diameter of the copper pipe and the inside diameter of flange 30 allows the solder to flow between the inside diameter of flange 30 and the outside diameter of the copper pipe thereby facilitating a good solder bond between the pipe and the horizontal pipe bracket 20. As shown in FIG. 1, the rivet holes 24 pass all the way through the horizontal pipe bracket 20 and allow for optional rivet attachment of the horizontal pipe bracket 20 to the steel strap 34.

In a typical residential construction, steel strap 34 is nailed between two studs of a stud bay and the horizontal pipe bracket 20 is slipped into place over the top of the steel strap 34. The copper plumbing pipe is then inserted through pipe hole 28 and soldered to the horizontal pipe bracket 20. This simple but effective procedure provides a secure connection between the plumbing pipe and the dwelling house structure.

Turning now to FIGS. 5 and 6, FIG. 5 shows a front view of a half-round horizontal pipe bracket and FIG. 6 is a side view of the bracket shown in FIG. 5. As can be seen from FIGS. 5 and 6, the locking tabs 22, rivet holes 24, U-channel area 21, and flange 26 are identical to their counterparts shown in FIGS. 1 and 2. The half-round horizontal pipe bracket 25 is inserted onto the steel strap 34, shown in FIG. 4 in the same manner as the horizontal pipe bracket 20 is inserted onto steel bracket 34. This bracket, however, has the advantage that it can be installed after the copper plumbing pipes are already in place. In this manner, a half-round horizontal pipe bracket 25 is inserted and locked onto a steel strap 34. The half-round pipe hole 38 is then fit over the previously installed copper pipe and the steel strap is then nailed between the two studs of a stud bay. The copper plumbing pipe is then soldered into place with solder flowing and bonding between the inside diameter of flange 36 and the outside diameter of the plumbing pipe. It should be noted at this point that these brackets can be made to accommodate any standard or nonstandard size copper pipe.

Turning now to FIGS. 7 and 8, FIG. 7 is a front view of a half-round vertical pipe bracket 40 and FIG. 8 is the side view of said bracket shown in FIG. 7. Again, the location and function of the locking tabs 22, the rivet holes 24, the U-channel area 21, and the flange 26 are identical to that described with reference to the brackets shown in FIGS. 1 and 5. However, this half-round vertical pipe bracket 40 is designed to secure a copper pipe rising vertically in a stud bay. This bracket is installed onto a steel strap 34 as previously described with reference to FIGS. 1 through 6. Again, this vertical pipe bracket 40 has the advantage that it can be installed after the plumbing pipes are already in place providing a secure and reliable means of attaching vertically rising plumbing pipes to the structure of a dwelling house. FIG. 8 shows a side view of the half-round vertical pipe bracket that is similar to the half-round bracket shown in FIG. 5. The bracket shown in FIG. 8 can also be made in a full-round configuration similar to that shown in FIG. 1.

Turning now to FIGS. 9 and 10, FIG. 9 is the front view of a horizontal pipe bracket 44 that is designed to utilize a plastic pipe securing device such as a Holdrite Model 400 insert. As shown in FIG. 10, there is no flange surrounding the pipe hole 42 such as flange 30 shown in FIG. 2 and flange 36 shown in FIG. 6. In this configuration, the pipe bracket 44 is installed on to a steel strap 34 as previously described. However, instead of soldering the plumbing pipe to the bracket, the plastic pipe holding device previously referenced is inserted into pipe hole 42 and locked into place. The plumbing pipe is then inserted through the center portion of the pipe holding device which securely holds the pipe to the pipe bracket 44. This arrangement is more clearly shown in FIG. 11 wherein pipe bracket 44 is shown attached to steel strap 34. A plastic pipe holding device 62 has been inserted into pipe hole 42 (FIG. 9), and a copper plumbing pipe 52 has been inserted through the plastic holding device 62. As can be seen from FIG. 11, this provides a quick and easy method of attaching both the pipe bracket 44 to the steel strap 34 as well as a quick and easy attachment of the plumbing pipe 52 to the pipe bracket 44. In this arrangement, it is not necessary that the pipe bracket or pipe be made of copper since no soldering is involved.

FIG. 11 also shows a typical method of attachment of the brackets shown in FIGS. 1, 5, and 7 to a steel strap 34. The steel strap 34 is nailed into the studs 50 at points 66 which provides a secure attachment of the steel strap 34 to the studs 50. Pipes 52 contained within the stud bay 54 are attached as shown to the pipe brackets 20, 25, 40, and 44. With reference to horizontal pipe bracket 20, the copper plumbing pipe 52 is soldered to the pipe hole 28 of horizontal pipe bracket 20. In a similar fashion, pipes 52 are soldered respectively to the pipe holes 38 and 42 of half-round horizontal pipe bracket 25 and half-round vertical pipe bracket 40. Half-round vehicle pipe bracket 40 is shown connected to the steel strap 34 in reverse so as to display the connection between the bracket 40 and the pipe 52.

The present invention therefore provides a quick means of attachment of a steel strap to studs of a stud bay and a corresponding simple and effective attachment of a pipe bracket to the steel strap. A copper plumbing pipe can then be either soldered in place or held in place with a plastic pipe holding device, all as shown in FIG. 11. The invention therefore provides an inexpensive and effective means of securing a plumbing pipe within a stud bay and thereby preventing rattling of pipes and movement of pipes after their attachment to such devices as a shower head or a shower water mixer valve. An additional advantage of this arrangement is that the pipes are held securely in place so that minor bumps and jarring that occur through careless construction practices will not damage, move, or misalign the plumbing pipes once they are installed and secured in place through the use of the brackets shown in FIG. 11.

The previous description with reference to FIGS. 1 through 11 has shown and described the preferred embodiment and novel features of the present invention, however, it will be understood that various omissions, substitutions, and changes in the forms and details of the devices illustrated may be made by those skilled in the art without departing from the spirit of the invention and the scope of the claims.

What is claimed is:

1. A pipe bracket for fastening a metallic pipe to a metallic strap attached to a stud bay comprising
a metallic pipe bracket having a U-shaped portion, at least one locking tab and a pipe attachment portion having a support flange, said U-shaped portion having a front section, an interior section, and a back section forming a U-channel, said locking tab extending from the front or back section of said U-shaped portion into said interior section, said U-shaped portion being attached to said pipe attachment portion, said pipe bracket being attachable to said metallic strap, said metallic strap having a plurality of locking holes disposed in a manner such that when said U-shaped portion snaps onto said metallic strap a portion of said metallic strap is located in said interior section and such that said locking tab fits into at least one of said locking holes, said support flange being connectable to said metallic pipe.

2. The pipe bracket of claim 1 wherein
said pipe bracket is copper plated metal and said metallic pipe is copper.

3. A pipe bracket as in claim 1, wherein said support flange has a semi-circular recess at one edge for fitting over a pipe.

4. A pipe bracket as in claim 1, wherein said support flange has a circular opening for fitting over said metallic pipe.

5. The pipe bracket of claim 2 wherein
said pipe bracket is copper and said metallic pipe is copper.

6. A pipe bracket as in claim 1 wherein
said pipe attachment portion has a full-round hole.

7. A pipe bracket for fastening a metallic pipe to a metallic strap attached to a stud bay, comprising:
a metallic pipe bracket having a U-shaped portion, at least one locking tab and a pipe attachment portion having a support flange, said U-shaped portion having a front section, an interior section, and a back section forming a U-channel, said locking tab extending from the front or back section of said U-shaped portion into said interior section, said U-shaped portion being attached to said pipe attachment portion, said pipe attachment portion extending at an angle approximately perpendicular to said front and back sections of said U-channel, said pipe bracket being attachable to said metallic strap, said metallic strap having a plurality of locking holes disposed in a manner such that when said U-shaped portion snaps onto said metallic strap a portion of said metallic strap is located in said interior section and such that said locking tab fits into at least one of said locking holes, said support flange being connectable to said metallic pipe.

8. The pipe bracket of claim 7 wherein
said pipe bracket is copper plated metal and said metallic pipe is copper.

9. A pipe bracket as in claim 7, wherein said support flange has an approximately semicircular recess at one edge for engagement over a pipe.

10. A pipe bracket as in claim 7, wherein said support flange has a circular opening for fitting over a pipe.

11. The pipe bracket of claim 7 wherein
said pipe bracket is copper and said metallic pipe is copper.

12. A pipe fastener for fastening a pipe to a strap attached to a stud bay comprising
a pipe bracket having a U-shaped portion, at least one locking tab and a pipe attachment portion, said U-shaped portion having a front section, an interior section, and a back section forming a U-channel, said locking tab extending from the front or back section of said U-shaped portion into said interior section, said U-shaped portion being attached to said pipe attachment portion, said pipe bracket being attachable to said strap, said strap having a plurality of locking holes disposed in a manner such that when said U-shaped portion snaps onto said strap, a portion of said strap is located in said interior section and such that said locking tab fits into at least one of said locking holes, said pipe attachment portion being attachable to said pipe through use of a plastic attachment ring.

* * * * *